(12) United States Patent
Quint et al.

(10) Patent No.: US 12,521,533 B2
(45) Date of Patent: Jan. 13, 2026

(54) DYNAMIC DERIVATION OF THE INFLATION BEHAVIOR OF A DILATION CATHETER

(71) Applicant: BIOTRONIK AG, Bülach (CH)

(72) Inventors: Bodo Quint, Dettighofen (DE); Fabian Risch, Doerflingen (CH)

(73) Assignee: BIOTRONIK AG, Buelach (CH)

( * ) Notice: Subject to any disclaimer, the term of this patent is extended or adjusted under 35 U.S.C. 154(b) by 147 days.

(21) Appl. No.: 18/537,178

(22) Filed: Dec. 12, 2023

(65) Prior Publication Data

US 2024/0198061 A1    Jun. 20, 2024

(30) Foreign Application Priority Data

Dec. 20, 2022   (EP) ..................................... 22214795

(51) Int. Cl.
*A61M 25/10*   (2013.01)
*A61M 25/00*   (2006.01)

(52) U.S. Cl.
CPC .... *A61M 25/104* (2013.01); *A61M 25/10181* (2013.11); *A61M 25/10187* (2013.11); *A61M 2025/0001* (2013.01); *A61M 2205/3334* (2013.01)

(58) Field of Classification Search
CPC ...... A61M 25/10181; A61M 25/10184; A61M 25/10187; A61M 25/104; A61M 2025/0001; A61M 2025/1052; A61M 2205/3334; A61B 5/02007; A61B 5/6853
See application file for complete search history.

(56) References Cited

U.S. PATENT DOCUMENTS

| | | |
|---|---|---|
| 10,111,683 B2 | 10/2018 | Tsamir et al. |
| 2010/0113939 A1 | 5/2010 | Mashimo et al. |
| 2011/0137580 A1 | 6/2011 | Bartels et al. |
| 2014/0276198 A1 | 9/2014 | Dunung et al. |
| 2022/0287730 A1 | 9/2022 | Chisena et al. |

FOREIGN PATENT DOCUMENTS

| | | |
|---|---|---|
| CN | 107050627 A | 8/2017 |
| EP | 1931272 B1 | 11/2014 |
| EP | 2579765 B1 | 8/2019 |

OTHER PUBLICATIONS

European Search Report from the corresponding European Patent Application No. EP 22214795.1, dated Jun. 9, 2023.

*Primary Examiner* — Robert A Lynch
(74) *Attorney, Agent, or Firm* — Greer, Burns & Crain, Ltd.; Steven P. Fallon

(57) ABSTRACT

A balloon catheter system has a catheter with a catheter shaft surrounding a lumen. A balloon is connected to a distal end of the catheter shaft such that a fluid inflation medium can be introduced into or removed from a balloon interior via the lumen. A pressure sensor is configured to measure an instantaneous pressure (p) of the inflation medium in the lumen during inflation and/or deflation of the balloon. A flow sensor is configured to measure an instantaneous volume flow (v) of the inflation medium during the inflation and/or deflation. An evaluation unit is configured to record the instantaneous pressure and the instantaneous volume flow and to determine therefrom a time curve of the flow resistance (R).

14 Claims, 8 Drawing Sheets

DYNAMIC DERIVATION OF THE INFLATION BEHAVIOR OF A DILATION CATHETER

PRIORITY CLAIM

This application claims priority under 35 U.S.C. § 119 and all applicable statutes and treaties from prior European Application No. EP22214795.1, which was filed Dec. 20, 2022.

FIELD OF THE INVENTION

A field of the invention concerns balloon catheter systems and a method for analyzing the balloon behavior.

BACKGROUND

When the balloon of a balloon catheter is positioned in the area of a stenosis to be removed during angioplasty, the balloon is typically inflated at a high pressure (up to 16 atm) with a fluid inflation medium introduced into the balloon interior. The balloon expands in a radial direction (i.e. perpendicular to the axial direction of the balloon catheter). Strong pressure exerted by the balloon on the vessel wall, e.g. during an angioplasty, presses calcium deposits into the vessel wall and the vessel diameter increases.

An attending physician should receive feedback on the balloon behavior during balloon inflation and deflation so that the angioplasty can be performed as precisely as possible and in a controlled manner. Generally, it is helpful if the attending physician can receive feedback as to when the balloon comes into contact with the vessel wall during inflation, how much energy is required to break up or dilate the stenosis and when the balloon loses contact with the vessel again during deflation.

WO 2014/210450 discloses systems and methods for measuring and providing a real-time indication of the inner diameter, counterforce and compliance of a biological test lead that may include a lesion. In this method a reference volume pressure characteristic is determined by inflating a reference balloon with a known set of known physical properties at a known and fixed inflation rate to a known and fixed volume, and the pressures associated with incremental volume changes are measured. The outer diameter of the reference balloon is measured during the inflation and expansion and the outer diameter of the expanding reference balloon is mapped to the incremental volume changes and associated pressures. At least one reference volume pressure characteristic is determined, which is generated by inflating a test balloon. The test balloon has the set of known physical properties of the reference balloon, at the known and fixed inflation rate and the fixed volume inside the biological test lead (body vessel with comparable vessel lumen at a site without stenosis), and the pressure associated with the incremental volume changes is measured. Determinations or comparisons can then be made, including: the at least one reference volume pressure characteristic is compared with the at least one test volume pressure characteristic and at least one inner diameter of the biological test lead, at least one counterforce of the biological test lead on the expanding test balloon and at least one measurement of a volume pressure characteristic of the biological line and/or lesion.

The measurement of the volume in balloon catheter systems is generally associated with several sources of error. For example, when an inflation pump is operated manually, the residual amount of air in the inflation system can represent a disturbance variable. These disturbance variables, such as the inclusion of air in the catheter, can make evaluations of the type described above much more difficult.

Furthermore, a volume measurement which only records the motorized filling of the catheter via a piston is problematic in that it depends on the venting state of the pressure-generating system.

Furthermore, the recording of a test volume pressure characteristic in a biological test lead (body vessel with comparable vessel lumen at a site without stenosis) is at least associated with additional effort. This additional effort prolongs the procedure and causes greater strain on the patient to be treated. In addition, it cannot be ensured that a suitable biological test lead is available for each patient. Furthermore, the recording of a test volume pressure characteristic is only possible with a balloon catheter system without a stent.

SUMMARY OF THE INVENTION

A preferred balloon catheter system and method make it possible to determine balloon behavior on inflation and/or deflation, without requiring reference measurements of the catheter. A preferred system and method can also prevent having residual air in the catheter to avoid interference with the measured results.

A preferred balloon catheter system, suitable for angioplasty includes a catheter which has a catheter shaft surrounding a lumen. A balloon is connected to a distal end of the catheter shaft, such that a fluid inflation medium can be introduced into a balloon interior of the balloon via the lumen and can be removed from the balloon interior. A pressure sensor is configured to measure an instantaneous pressure of the inflation medium in the lumen or in the balloon interior when inflating and/or deflating the balloon. A flow sensor is configured to measure a volume flow of the inflation medium when inflating and/or deflating the balloon. An evaluation unit is configured to save the instantaneous pressure and the instantaneous volume flow when inflating and/or deflating the balloon and to determine a time curve of the flow resistance from the measured variables of the instantaneous pressure and the instantaneous volume flow. The flow resistance can be determined from the ratio of instantaneous pressure to instantaneous volume flow, i.e., volume to time.

BRIEF DESCRIPTION OF THE DRAWINGS

In the following, embodiments of the invention and further features and advantages of the invention are explained with reference to the Figures. In the Figures.

DETAILED DESCRIPTION OF THE PREFERRED EMBODIMENTS

Figure 1:
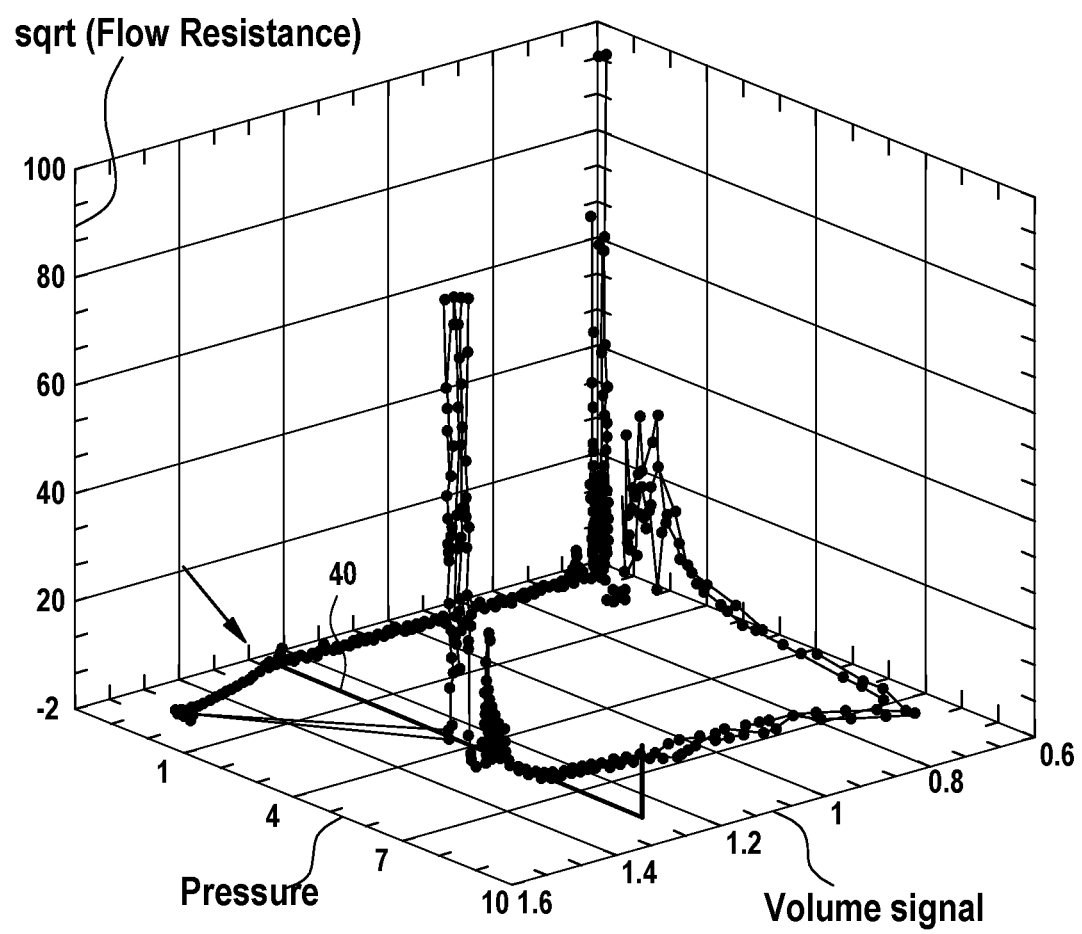
FIG. 1 shows an information reduction to the signals volume(flow) and pressure—(the determined integral flow signal or measured volume signal is now selected as the abscissa). In order to show in principle the reproducibility of such measurements, three successive catheter inflations are shown in the unloaded catheter state. A "slow inflation" was performed to a pressure of 7 bar.

The systematized knowledge of a balloon catheter system can provide additional information for clinical use without detailed knowledge of the inflation-deflation characteristics. The level of detail of the information can be refined via systematic knowledge of a catheter design. The sensory data acquisition required for this does not require a high degree of measurement precision, as a detailed discussion of the data situation allows measured variables to be standardized retrospectively (deductively) to compensate for systematic data acquisition errors.

A curve of the dynamic data acquisition, e.g. at the luer of a catheter port, in particular pressure and volume flow of the fluid inflation medium, can, if necessary with systematic background information on a catheter design, advantageously provide the following:

determine an incomplete catheter dilatation and recommend post-dilation, determine the dynamic counterpressure across the tissue of the dilation or implantation site, determine work necessary for a dilated volume and thus the possibility of classifying a stenosis and better estimating the type and nature of the stenosis, estimate the amount of residual air in the catheter, compensate for manufacturing-related variations in the flow resistance in the catheter shaft of the catheter, consider the viscoelastic deformation of the balloon and thus more precise diameter information than is possible with a compliance chart, classify the kinetics of the plastic tissue change and thus optimize clinical interventions, for balloon-based implantation systems it is possible to indicate from when a stent has been deployed and subsequently the data processing can be changed for possible post-dilation of the stent by the balloon, detect deficits during the dilation (for example a clearly limited volume of the dilation process) and a warning and recommendation for post-dilation based on this detection, the time from which a specified pressure—transmitted by an inflation system—is physically applied to the balloon is unknown to the user and can now be detected and visualized.

The invention enables the detection of undesirable effects and effects that differ from the expected course during the dilation of a stenosis. In this way, possible complications can be avoided during the dilation of a stenosis and the process of dilating the stenosis can be improved.

According to a preferred embodiment of the invention it is provided that the evaluation unit is configured to determine one variable of the following variables from the time curve of the flow resistance:

a time point at which the balloon contacts a vessel wall of the patient on inflation, energy necessary for dilating a stenosis of the patient, a time point at which the stenosis is dilated.

The flow resistance, which corresponds to the ratio of a pressure applied to a balloon catheter system to a volume flow into the balloon catheter system, can be considered as a measure for the resistance against which the balloon has to be inflated. In case the balloon is inflated without an external force acting on the balloon, the flow resistance is determined by balloon-specific properties, such as for example the balloon geometry, balloon dimensions, the folding of the balloon, the material of the balloon wall and the strength of the balloon wall. In the event that the balloon is inflated against a vessel wall and thus the vessel expands during inflation, the flow resistance is also determined by the vessel which counteracts the balloon inflation. For example, if the balloon is inflated inside a stenosis so that the stenosis is widened, the flow resistance will also depend for example on the nature of the stenosis, the dimensions of the stenosis or the degree of calcification of the stenosis.

From the time point at which the balloon contacts a vessel wall of the patient when inflating, the flow resistance with a corresponding volume flow into the balloon will be greater and increase more strongly compared to that of a balloon without external force on the inflating balloon (for example on the inflation of the balloon outside a vessel in the air). On the dilation of a stenosis the flow resistance is at a maximum depending on time at a volume flow in the balloon and then falls again with increasing inflation of the balloon to the flow resistance of a balloon without external force acting on the inflating balloon. From this time point the flow resistance dominates which is caused by the expansion of the balloon itself and flow resistances caused by the expansion of the stenosis or vessel are negligible in comparison. This time point can be understood as the time point at which the stenosis is dilated.

Preferably, the time point at which the stenosis is dilated is the time point at which the time curve of the flow resistance after reaching a maximum of the flow resistance reaches a deviation from the time curve of the flow resistance without external force acting on the balloon with corresponding volume flow into the balloon of 5% or less, further preferably of 1% or less and particularly preferably of 0.1% or less.

The energy $W_{stenosis}$, necessary for the dilation of the patient's stenosis, corresponds to the (volume)work $W_{total}$, performed for inflating the balloon between the time point $t_1$ at which the balloon contacts a vessel wall of the patient during inflation and the time point $t_2$ at which the stenosis is dilated, minus the proportion of the work done $W_{balloon}$, that was used exclusively to expand the balloon itself in the period between time point $t_1$ and time point $t_2$ ($W_{balloon}$ corresponds to the work which would be done during the inflation of the balloon without external force being applied to the inflating balloon).

For the volume work W:

$$W = \int pVdpdV$$

with pressure p and volume V.
For the power P:

$$P = \frac{p^2}{\frac{dV}{dt}} = \frac{p^2}{v}$$

with volume flow v.
It follows from this for $W_{total}$:

$$W_{total} = \int_{t_1}^{t_2} \frac{p^2(t)}{v(t)} t dt$$

With the flow resistance $$R = \frac{p}{v}; \quad W_{total} = \int_{t_1}^{t_2} p(t)R(t)dt$$

The flow resistance R(t) is composed of a flow resistance $R_{stenosis}$ resulting from the dilation of the stenosis and a flow resistance $R_{balloon}$ resulting from the dilation of the balloon. Thus, the energy $W_{stenosis}$, which was necessary for dilating the patient's stenosis, can be calculated as follows:

$$W_{stenosis} = \int_{t_1}^{t_2} p(t)(R(t) - R_{balloon}(t))dt$$

The time curve of the flow resistance R is determined by the evaluation unit.

Furthermore, the evaluation unit is configured to interpolate the time curve of the flow resistance $R_{balloon}$ between the time points $t_1$ and $t_2$. Preferably, the evaluation unit is configured to interpolate the time curve of the flow resistance $R_{balloon}$ between the time points $t_1$ and $t_2$ as follows:

$$R_{balloon}(t) = \frac{(R_{balloon}(t_2) - R_{balloon}(t_1)) * (t - t_1)}{t_2 - t_1} + R_{balloon}(t_1)$$

A determination of the energy $W_{stenosis}$, which was necessary for the dilation of the patient's stenosis, can thus be carried out in particular analytically, numerically or by totaling the products $p(t)(R(t)-R_{balloon}(t))$ for the individual measured variables in the time interval $[t_1; t_2]$.

As a diagnostic result, the physician receives information from the energy needed for the dilation, in particular information on a hardness or mechanical strength of the stenosis.

Furthermore, according to one embodiment of the invention it is provided that the catheter has a catheter port in flow connection with the lumen (e.g. at a proximal end of the catheter shaft), wherein the pressure sensor is configured to measure the instantaneous pressure at the catheter port and/or wherein the flow sensor is configured to measure the volume flow at the catheter port. In particular, the catheter port can be in the form of a luer connector.

Alternatively, or in addition to the flow sensor, the evaluation unit is configured to receive data from a device, wherein the data includes the instantaneous pressure of the inflation medium in the lumen or in the balloon interior when inflating or deflating the balloon and the volume flow of the inflation medium when inflating or deflating the balloon.

In the context of the present invention components or locations which are closer to the user (physician) of the balloon catheter along the balloon catheter are referred to as proximal. Accordingly, components or locations which are further apart from the user of the balloon catheter are referred to as distal.

According to one embodiment of the invention the flow sensor may be a Coriolis flow sensor. In such a flow sensor the Coriolos principle is used in a known manner to measure a mass flow or a volume flow of the inflation medium. Due to the generated flow rates, and also the direct mass dependency, the volume measurement according to the Coriolis principle appears to be advantageous. This sensor principle can be miniaturized in principle and is therefore suitable for catheter use. Due to the absence of joins or material transitions in forming this sensor, this type of sensor is particularly suitable for resterilization by liquid sterilization. Alternatively, thermal volume flow sensors can also be used if necessary.

Furthermore, according to one embodiment of the invention it is provided that the balloon catheter system includes a pump for inflating and/or deflating the balloon with the fluid inflation medium.

According to one embodiment the pressure sensor is integrated into the pump.

Furthermore, according to one embodiment of the invention the flow sensor of the balloon catheter system can be integrated into a sensor unit which is configured to connect the pump to the catheter port, i.e. to establish a flow connection between the pump and the catheter port, via which the inflation medium can be introduced into the balloon interior (or removed from the balloon interior).

According to an alternative embodiment of the invention it is provided that the pressure sensor and the flow sensor are integrated into a sensor unit, which is configured in turn to connect the catheter port and the pump to one another, i.e. to establish a flow connection between the pump and the catheter port, via which the inflation medium can be introduced into the balloon interior (or removed from the balloon interior).

According to one embodiment it is also provided that the sensor unit is configured to transmit the measured instantaneous pressure variables and the measured instantaneous volume flow variables wirelessly to the evaluation unit.

According to one embodiment of the sensor unit it is provided that the sensor unit has an energy storage unit (e.g. a battery). Furthermore, the sensor unit preferably has a coil for establishing the wireless communication (e.g. radio link, in particular near-field communication) and in particular for charging the energy storage unit.

Furthermore, the sensor unit can include an antenna (e.g. at a transmission frequency of 433 MHz) for transmitting and receiving radio signals.

Furthermore, according to one embodiment of the invention it is provided that the balloon catheter system includes a data acquisition unit which is configured for inputting one or more of the parameters characterizing the catheter (for example product number represented by a barcode for example), in particular to enable identification of the catheter used.

Furthermore, according to one embodiment of the invention it is provided that the evaluation unit is configured to use the respective parameter to determine the at least one variable (see above). The evaluation unit can optionally use the parameters or catheter-specific additional information to improve/make more precise the signal evaluation and data processing.

According to one embodiment of the invention the evaluation unit can also be integrated into the data acquisition unit or communicate therewith in a suitable manner. These two components may form a unitary device. Such a device may be formed by a computer for example, on which corresponding software is implemented.

Furthermore, according to one embodiment of the invention it is provided that the catheter port includes an inlet lumen which is flow connection with the lumen of the catheter shaft. In this way the sensor unit has an outlet area for discharging the inflation medium from the sensor unit, wherein the outlet area is configured to engage positively in the inlet lumen. In this way a residual volume of the catheter port can be advantageously avoided. Otherwise air could collect in such a residual volume which could falsify the measurement results due to the compressibility of the air.

Advantageously, the balloon catheter system is configured to determine a drop in pressure across the inlet lumen. In this way the pressure in the direction of the volume flow is determined in front of the inlet lumen and in the inlet lumen. The volume flow can be determined from the difference between these two pressure values.

According to an further embodiment the catheter shaft is part of the flow sensor. In this way a precise determination of the volume flow through the catheter shaft can be achieved.

Alternatively to the catheter port/outlet area as configured above the residual volume in the catheter port can also be corrected mathematically (e.g. by the evaluation unit), if the said residual volume of air in the catheter is known by corresponding precharacterization.

A further aspect of the present invention relates to a method for inflating a balloon of a catheter with a fluid inflation medium, including the steps:
  measuring and recording an instantaneous volume flow of the inflation medium and an instantaneous pressure of the inflation medium when inflating or deflating the balloon, and
  automatically determining a time curve of the flow resistance when inflating or deflating the balloon by using measured [or recorded] variables of the instantaneous pressure and the instantaneous volume flow.

According to one embodiment of the method, it is provided that by using the flow resistance or the time curve of the flow resistance at least one variable of the following variables is automatically determined:
  a time point, at which the balloon contacts a vessel wall of the patient on inflation,
  energy necessary for dilating a stenosis of the patient,
  a time point, at which the balloon loses contact with the vessel on deflation.

Furthermore, according to one embodiment of the method it is provided that the evaluation unit is configured to automatically integrate the flow resistance to determine the respective variable.

In the following, embodiments and examples of the solution according to the invention are described in more detail, wherein the underlying algorithm of the invention is demonstrated. It is explained here which measured variables are evaluated, why a reference measurement can be dispensed with (knowledge of the catheter design is sufficient) and how disturbance variables can be dealt with.

The algorithm is shown in a representation of the inflation and deflation curves in the space pressure/volume/flow resistance. The flow resistance is calculated by the ratio of the applied pressure p at the catheter port 24 and the volume flow V'=dV/dt occurring there (p/V') and corresponds to the dimension bar/(ml/s) according to the electrically analogue resistance definition (U/I).

In the individual graphs exponential scaling is used to better depict small flow resistance changes. The flow resistance is subject to an exponential transformation, which corresponds to the root function, but accepts a change of sign to also be able to represent a reversal of the flow direction.

FIG. 1 shows information reduction to the signals volume (flow) and pressure (the determined integral flow signal or measured volume signal is selected as the abscissa). In order to show the reproducibility of such measurements in principle, three successive balloon inflations are represented in the unloaded catheter state. Compared to a typical inflation a "slow inflation" was performed at a pressure of 7 bar.

During real catheter use, the tissue contact will lead to temporally modified inflation kinetics and—also after dilation has occurred—a reduced volume signal.

Interestingly, the characteristic volume, from which the energy of the catheter stored elastically in the balloon segment and in the residual air still supports the deflation, can be very well detected during the deflation (arrow in FIG. 1). Accordingly, the volume signal (line 40 in der FIG. 1) can be determined from which the transition from "residual air compression" to the geometrical limitation of the balloon or the tissue also occurs during inflation. It is even possible to evaluate, without knowledge of the balloon characteristics, whether and from which filling level either the balloon contact or even the tissue contact has a limiting effect. Thus, the volume displaced by the catheter use can be estimated during the catheter use. With knowledge of the catheter design, the filling volumes of the catheter and their pressure-related changes can be systematized.

Thus, it is possible to determine the filling behavior of the catheter with prior design knowledge and the practical real-time measurement of pressure and volume flow. Prior design knowledge includes characteristic volume properties and the viscoelastic behavior of the balloon in unloaded conditions of use (inflation of the balloon outside the vessel in air).

Production-related differences and viscosity influences of the X-ray contrast medium can be compensated for, as these can actually be detected via the shaft resistance (i.e. the flow resistance in the shaft of the catheter) during catheter use.

From the visualization based on the volume signal it is also plausible, why rational acquisition criteria such as "the initial volume corresponds to the final volume after deflation", can be used to compensate for rougher differences such as leakages, or excluding this error also sensor-induced acquisition drift.

In this way a retrospective simulation (i.e. after deflation has occurred) of data acquired during the use of the catheter can describe the behavior of the unloaded catheter and this behavior can be made more precise with actual measurement data from use of the catheter.

If significant differences from this systematic catheter behavior are registered during the use of the catheter they are attributable to the tissue contact, in particular contact with a vessel wall surrounding the balloon.

The following examples concerning the same catheter type are intended to show which statements are made possible by this.

The catheter is repeatedly inflated in a delimiting elastic silicone tube. Silicones have relatively poor elastic properties or exhibit a pronounced viscoelastic behavior.

Figure 2:
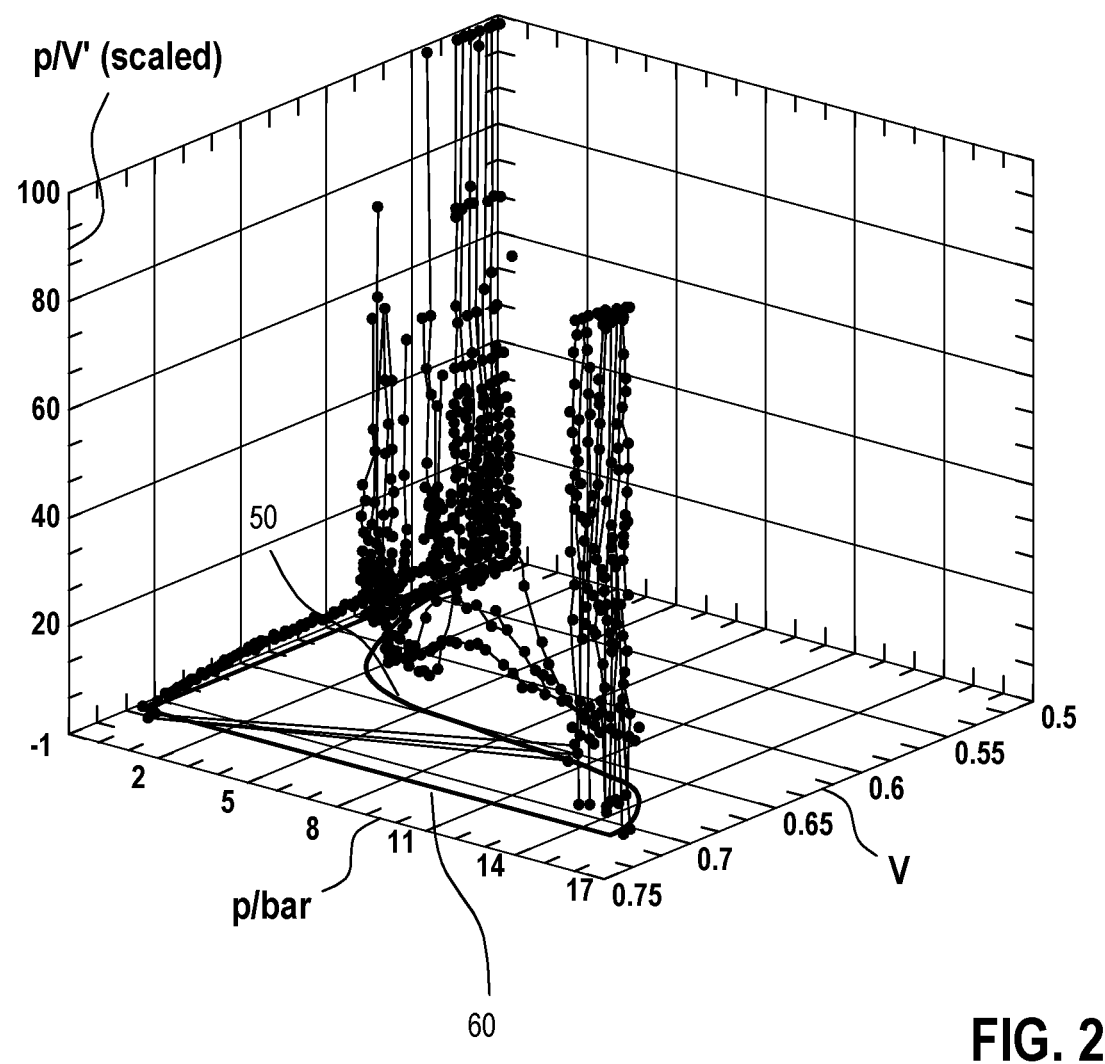
FIG. 2 shows successive inflations of a catheter in a delimiting silicone tube. Inflations are made to the nominal maximal pressure of the catheter (16 bar). The first curve shows a schematic inflation in the dimension volume signal/pressure. The second curve shows a schematic deflation in the same dimension.

In this respect, FIG. 2 shows successive inflations of a catheter in the delimiting silicone tube. In this case inflations take place at the nominal maximum pressure of the catheter (16 bar), wherein the first curve 50 indicates an inflation in the dimension volume/pressure: the second curve 60 corresponds to a deflation in the same dimension. The measured value acquisition (volume signal and pressure) is performed at the catheter port 24, in particular at the luer port point of the catheter 2. The flow resistance R (z-axis) is subject to an exponential transformation, which corresponds to the root function, but also accepts a sign of change (see above).

Figure 3:
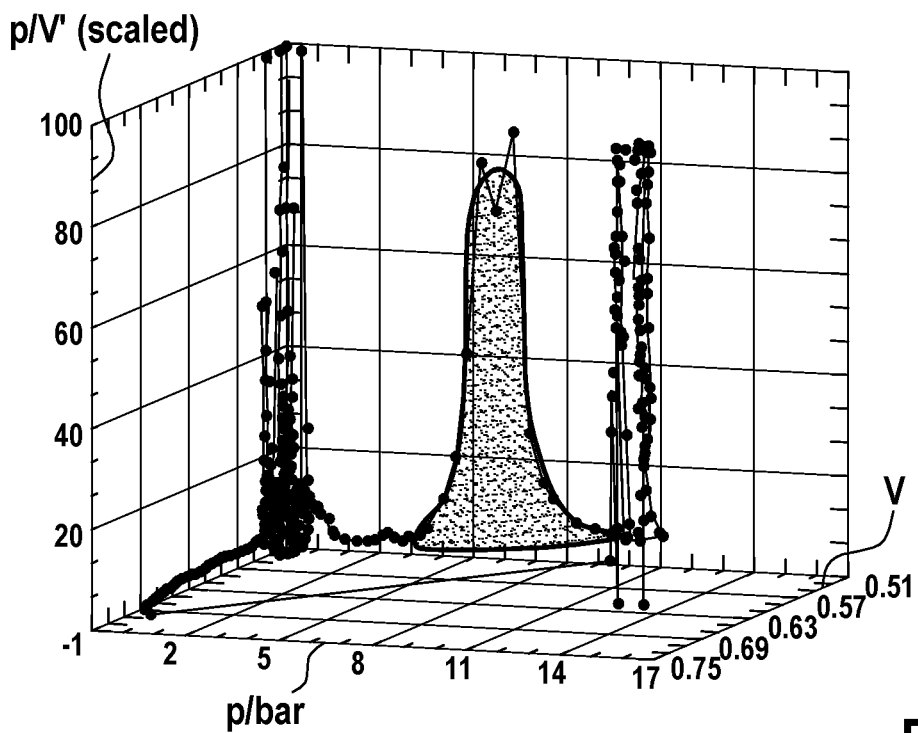
FIGS. 3-4 shows a comparison of the first catheter inflation according to FIG. 3 and the third catheter inflation according to FIG. 4 in the delimiting silicone tube.
Figure 4:
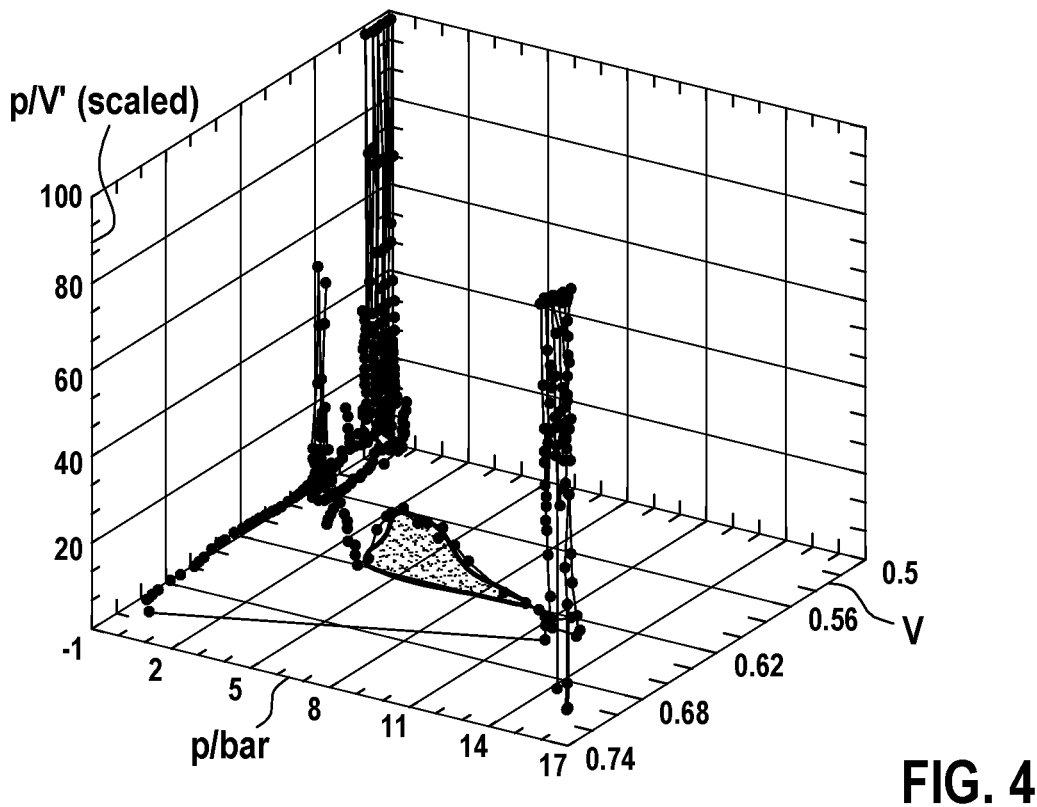

FIGS. 3 and 4 show a comparison of the first catheter inflation (curve above the hatched area of FIG. 3) and the third catheter inflation (curve above the hatched area in FIG. 4) in the delimiting silicone tube.

It can be seen from FIGS. 3 and 4 that the flow resistance determines the now additional energy needed for the deformation of the silicone tube. The deformation of the silicone tube in the first cycle requires much greater energy than in the third inflation. Both the energy and also the initial pressure required for the deformation to expand the balloon tube differ and decrease systematically with the loading cycle.

This behavior makes it possible to infer the mechanical intensity of the catheter intervention on a deformed vessel. In particular, it is thus possible to determine from which pressure the deformation occurs and the size of the displaced volume. In this case, volume and pressure work is performed which can be converted into deformation energy.

However, this observation can easily be overlooked in the energy produced for the catheter inflation, as can be seen from the following theoretical evaluation approach.

From the applied pressure and the volume difference the so-called volume work can be calculated which is performed during the inflation by a corresponding unit (e.g. pump) of the catheter system.

The volume work done (hatched area under the respective curves of FIGS. 3 and 4) for the catheter inflation shown in FIGS. 3 and 4 can be calculated using the formulae described in connection with FIG. 9.

Figure 5:
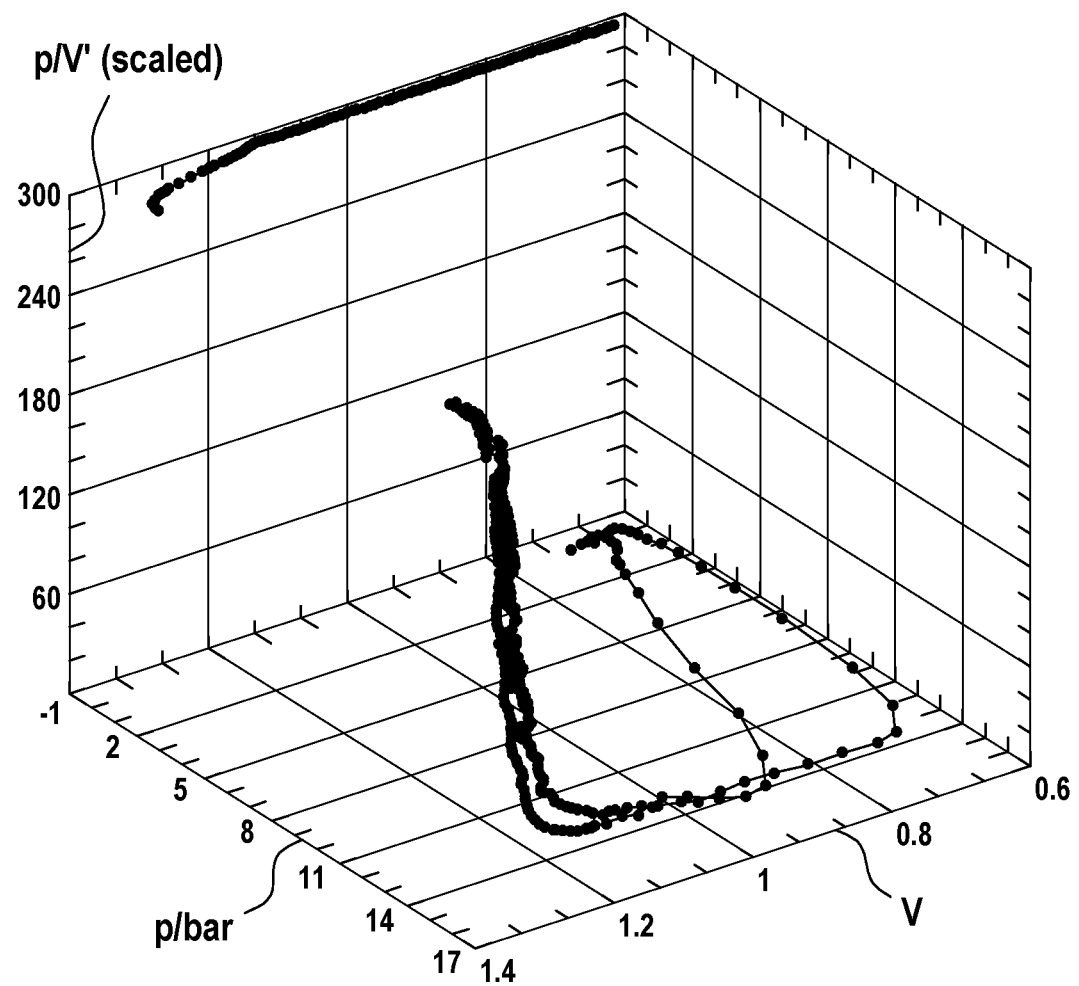
FIG. 5 shows a representation of the total energy of catheter inflation (z-axis) corresponding to the volume of work at the luer for a stent inflation without external restriction and an inflation of a silicone tube.

FIG. 5 shows a representation of such calculated total energy of catheter inflation (z-axis) corresponding to the volume work at the luer 24 for stent inflation without external restriction and for inflation of a silicone tube.

It is clear from the graph of FIG. 5 that only rough differences at the luer 24 of the catheter 2 can be detected easily. For example, the tension of the silicone tube on the balloon 22 can hardly be detected in contrast to the inherent stress that the high-strength balloon component develops. However, the representation of the filling resistance of the catheter 2 can be selected to be sensitive enough that even small energy uses can be localized.

With regard to the deformation work on a stenosis, which generally represents only a very small contribution to the total energy used, it is shown in an advantageous manner that this is relevant and clear, as well as almost completely separate from the catheter characteristic, if the balloon 22 is not yet fully tensioned in the region of a clearly limiting stenosis, which basically corresponds to the primary clinical situation of a balloon dilatation.

In this case the volume work is dominated by the displaced stenosis, as this primarily influences the volume flow.

However, in the overall consideration of the energy of the inflation the loss of energy caused by the shaft resistance and the delimiting elastic deformation of the high-strength balloon component is dominant.

Residual stress can then be detected if it can compete with the firm and slightly elastic balloon membrane—this is not or not very likely except in the treatment of an in-stent restenosis.

In this case however, a systematic prior knowledge of the characteristic behavior of the balloon membrane can be used to make the data so precise that even such cases can be calculated as significant differences.

For example, in order to measure the effect of a volume restriction in the vessel, e.g. another wire can be placed in the silicone tube, previously considered in the context of FIGS. 3 to 5 in order to geometrically constrict the balloon 22. Corresponding measurement results are shown in FIGS. 6 and 7.

Figure 6:
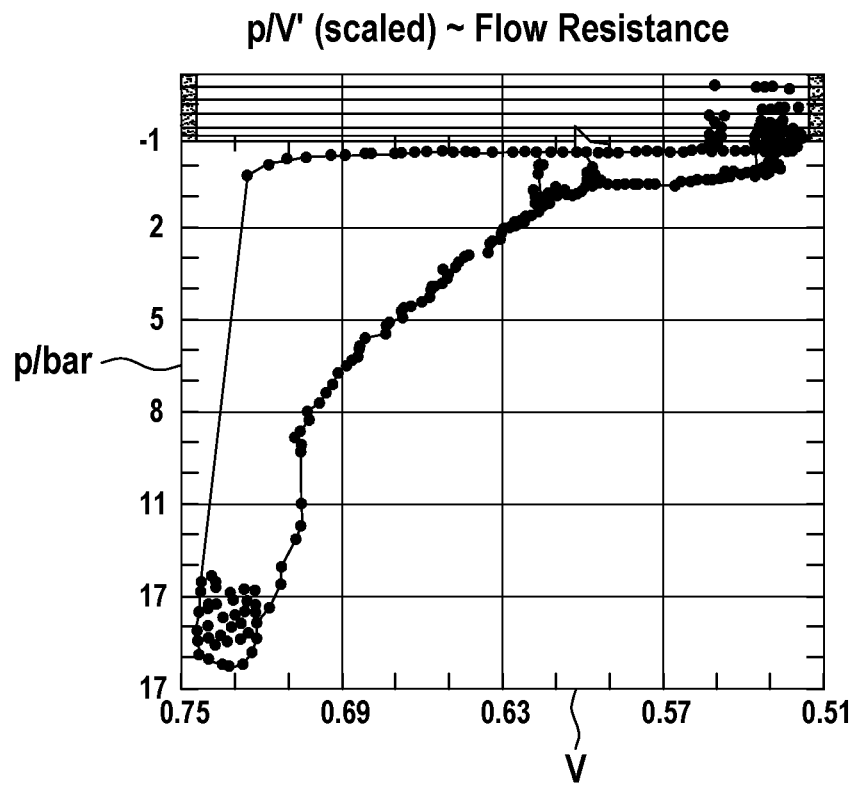
FIG. 6 shows the relationship between pressure and volume for the inflation of a balloon in a silicone tube without wire.
Figure 7:
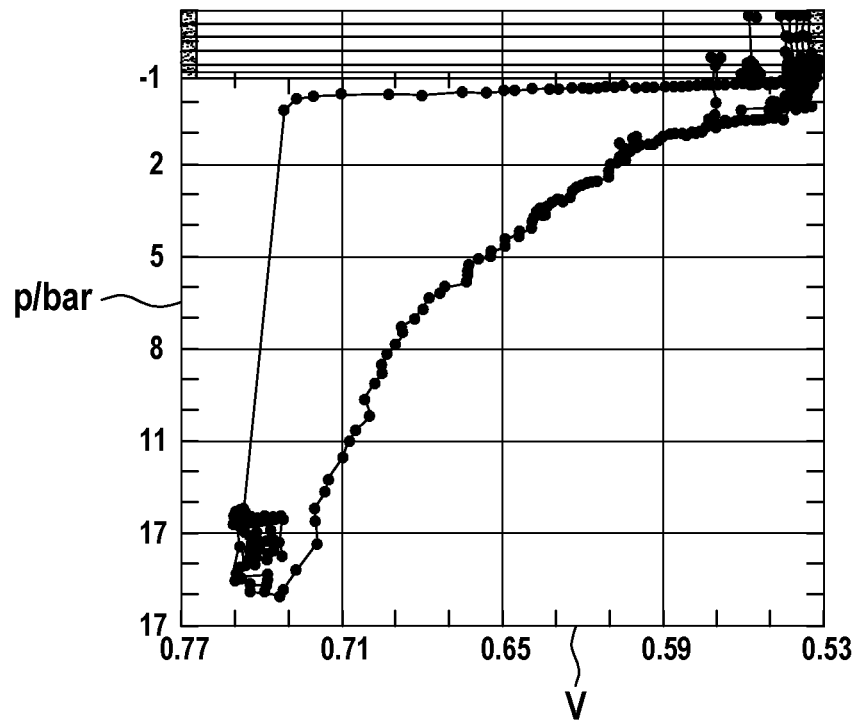
FIG. 7 shows the relationship between pressure and volume on the inflation of a balloon in a silicone tube with a wire placed in the lumen of the silicone tube to restrict the volume of the balloon.

Here, FIG. 6 shows the first inflation of the catheter 2 or balloon 22 in the silicone tube in the absence of the wire. FIG. 7 shows the situation with the wire in the silicone tube. On inflating the balloon 22 the latter thus presses again the wire, which thus represents a volume limitation for the balloon 22. FIG. 6 shows that the primary exponential kinetics of the balloon deformation is preceded by a linear deformation region (silicone tube is expanded). A similar primarily purely elastic behavior is also to be expected from the presence of air in the balloon 22. However, FIG. 7 shows that the additional wire primarily causes a geometric limitation and leads to a premature increase in pressure relative to the volume.

Figure 8:
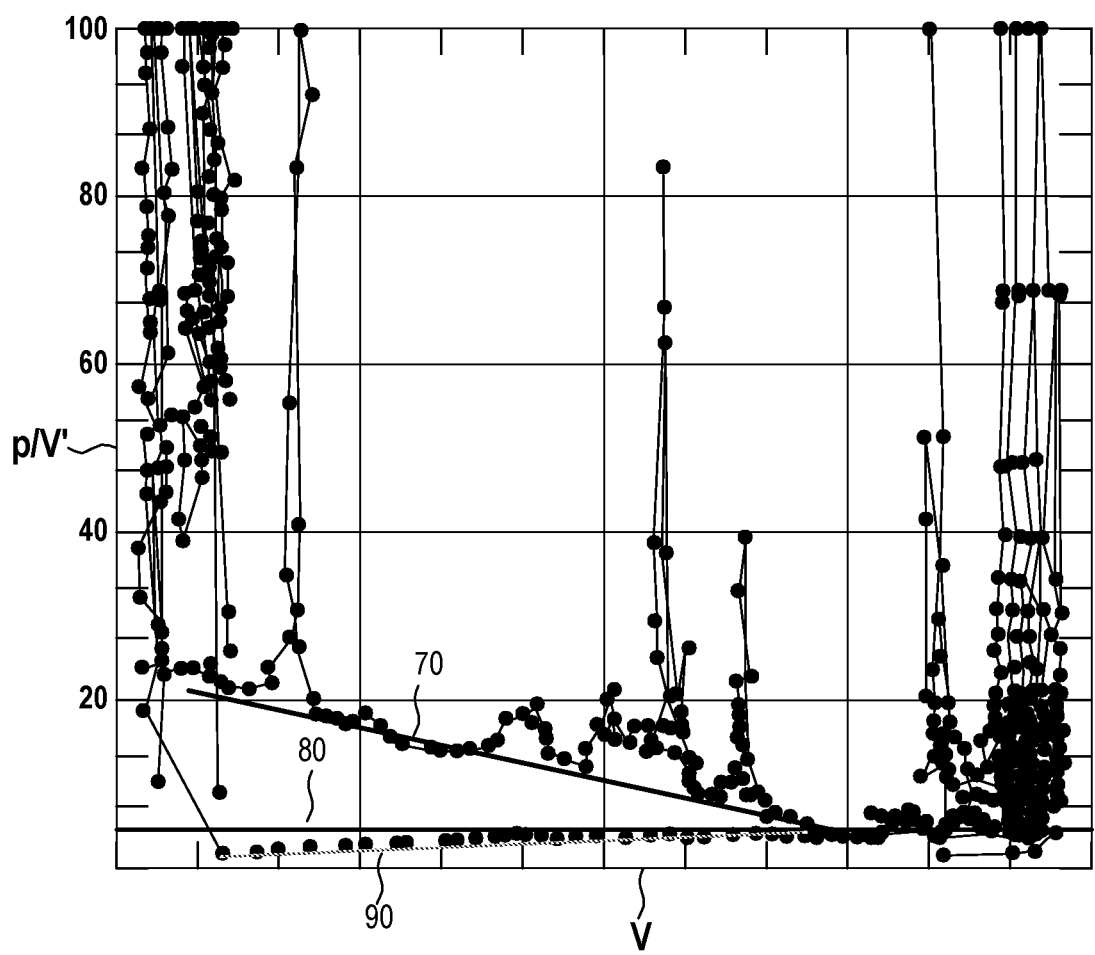
FIG. 8 shows the representation of the experiment with the silicone tube in the flow resistance volume plane.

The experiment with the silicone outer tube can also be used to show how a distinction can be made between plastic and elastic deformation. FIG. 8 shows the relationship between the flow resistance and the volume.

The second line 80 of FIG. 8 shows the shaft resistance level of the catheter. This typical shaft resistance is determined at an identical level for both the inflation and deflation cycle and can be estimated most accurately in the first seconds of inflation (large flow/high pressure difference).

The first line 70 of FIG. 8 shows that with the expansion of the silicone tube the force increases elastically, i.e. approximately linear. With an unloaded balloon 22 there is step from the region in which the filling of the catheter 2 is so intense that the balloon membrane is elastically tensioned.

Lastly, the third line 90 marks the increase in flow rate/decrease in shaft resistance which is due to stored energy which increases distally from the balloon 22 from the backflow.

The intersection point between the third line 90 and the second line 80 thereby determines the volume from which only the deflation pressure determines the backflow.

This is a volume which is dependent or determined by the catheter design which can be achieved when the vessel (or also a stent) is no longer able to exert an additional pressure. Here however the success of the dilation can also be estimated—how much volume displacement has occurred plastically—how much "recoil" or resetting has occurred elastically.

On the basis of this assessment a recommendation can be given to the physician to repeat the dilation process and if necessary also the diameter to which this dilation should be carried out.

From the above examples it is clear that the performance of the catheter system 1 can be improved significantly by an additional sensor system (in particular pressure and volume flow), and in a cost-effective manner and without restricting the other function of the catheter system.

Figure 10:
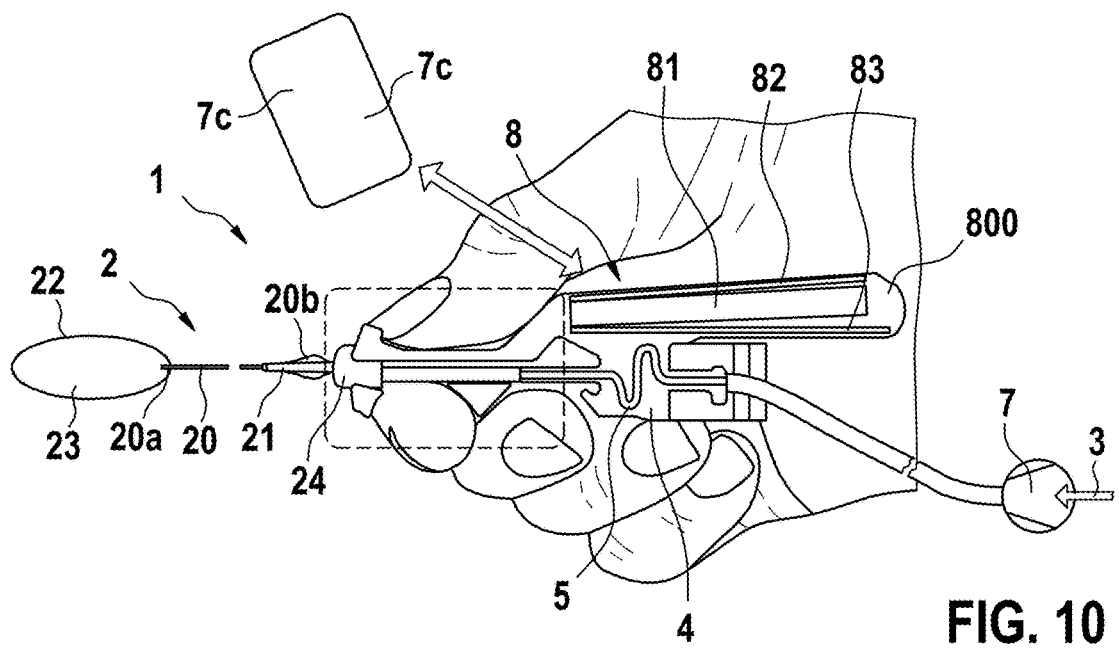
FIG. 10 shows a preferred embodiment of the balloon catheter system according to the invention.

According to the embodiment shown in FIG. 10 the balloon catheter system 1 in this respect includes in detail a catheter 2 having a catheter shaft 20 which surrounds a lumen 21. The catheter shaft 20 has a distal end 20a and a proximal end 20b. The catheter 2 further includes a balloon 22 which is connected to the distal end 20a of the catheter shaft 20, so that for inflating the balloon 22 a fluid inflation medium 3 can be introduced into a balloon interior 23 of the balloon 22 via the lumen 21 or for deflating the balloon 22 can be removed from the balloon interior 23. Furthermore, the balloon catheter system 1 includes a pressure sensor 4 which is configured to measure an instantaneous pressure p of the inflation medium 3 in the lumen 21 or in the balloon interior 23 on inflating or deflating the balloon 22, and a flow sensor 5 which is configured to measure a volume flow V' of the inflation medium 3 on inflating or deflating the balloon 22. For evaluating these measured values or time series the balloon catheter system 1 further includes an evaluation unit 6 which is configured to record the instantaneous pressure and the instantaneous volume flow on inflating or deflating the balloon 22 and to determine from these values a time curve of the flow resistance R.

The catheter system or method according to the invention is thus based on the detection of the pressure and volume flow at an inlet of the catheter. The resulting flow resistance at any time point is made up additively and primarily dominantly of the catheter shaft resistance,
the existing balloon restrictions,
the tissue contact between the balloon and an adjacent vessel wall,
a stent expansion,
and the resistance which ultimately results from the limitation of the balloon dimensions.

The required power at the inlet or catheter port 24 of the catheter 2 can be calculated as P=dp*V*, where V' is the volume flow and dp is the pressure difference. This corresponds to the electro-hydraulic analogy of the electric power P=U*I, where the voltage U of the pressure difference dp and the electric current I correspond to the volume flow V'. The power can also be expressed by the flow resistance R, which in the analogy corresponds to the ohmic resistance: P=V·2*R.

The energy, which is put into the catheter, is obtained by multiplying the power with time (wherein V'*t gives the volume V): E=dp*V.

It is interesting here that the instantaneous power but also the corresponding power changes, in the time curve of the total energy can be determined by knowledge of the volume flow and flow resistance—or also a resistance contribution—at a certain time point.

This means that the increase in resistance (e.g. due to the restriction of a silicone tube) can be considered separately from the overall system by the relative resistance change (interpreted as an electric series circuit).

Furthermore, the simultaneous volume flow is known. This means that the pressure exerted by the balloon to open the stenosis can be determined indirectly, as well as the energy used for this.

As the energy necessary for filling the catheter is dominant, this effect is only a temporary and a minor deviation from the typical unloaded catheter behavior. Remaining residual stresses can hardly be estimated, as subsequently the high-strength balloon membrane becomes dominant for the volume work.

For these reasons, knowledge of a systematic inflation behavior can help to make these observations more precise, but in principle it is not absolutely necessary as long as the balloon membrane is not yet elastically tensioned or has a limiting effect.

Figure 9:
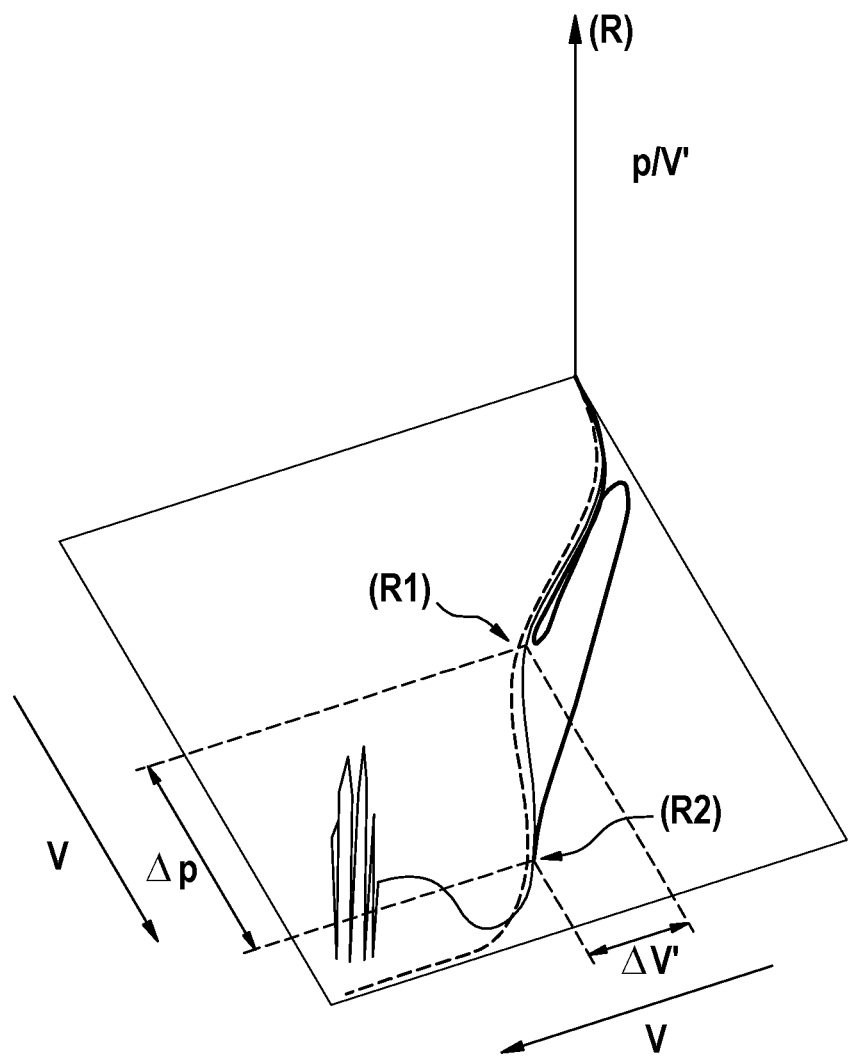
FIG. 9 shows a schematic representation of the evaluation of the measured pressure and volume flow values.

According to FIG. 9, in order to evaluate the measurement data, the product of pressure and flow resistance between a first point R1 and a second point R2 is preferably integrated, or these products are totaled for the respective individual measured values in order to determine the total energy expended to inflate the balloon between R1, at which the balloon contacts a vessel wall of the patient during inflation, and R2, at which the stenosis is dilated:

$$W_{total} = \int_{t_1}^{t_2} \frac{p^2(t)}{V'(t)} t\, dt$$

with pressure p, volume flow V', the time $t_1$ of point R1 and the time $t_2$ of point R2.

With the flow resistance $$R = \frac{p}{V'} : W_{total} = \int_{t_1}^{t_2} p(t) R(t)\, dt$$

The flow resistance R(t) is composed of a flow resistance $R_{stenosis}$ resulting from the dilation of the stenosis and from a flow resistance $R_{balloon}$ resulting from the expansion of the balloon. Thus, the energy $W_{stenosis}$, which was necessary for the dilation of the patient's stenosis, can be calculated as follows:

$$W_{stenosis} = \int_{t_1}^{t_2} p(t)(R(t) - R_{balloon}(t))\, dt$$

The time curve of the flow resistance R is determined by the evaluation unit. The time curve of the flow resistance $R_{balloon}$ between the time points $t_1$ and $t_2$ is interpolated by the evaluation unit:

$$R_{balloon}(t) = \frac{(R_{balloon}(t_2) - R_{balloon}(t_1)) * (t - t_1)}{t_2 - t_1} + R_{balloon}(t_1)$$

From this the energy $W_{stenosis}$, which was necessary for the dilation of the patient's stenosis, can be determined analytically, numerically or by totaling the products $p(t)(R(t) - R_{balloon}(t))$ for the individual measured variables in the time interval $[t_1; t_2]$.

From this, both the relative pressure which had to be exceeded for deformation and the deformation energy for this "partial process" can be calculated as interesting variables. Further interesting variables, which can be determined according to the this evaluation method are e.g.

a time point at which the balloon contacts a vessel wall of the patient on inflation, or a time point at which the balloon loses contact with a vessel again on deflation.

As also shown in FIG. 10, the balloon catheter system 1 may include a pump 7 for inflating and/or deflating the balloon 22 with the inflation medium 3.

According to one embodiment, it can be provided that the pressure sensor is integrated into the pump 7. The said flow sensor of the balloon catheter system 1 could then be integrated into a sensor unit which is configured to connect the pump 7 to the catheter port 24.

Preferably however, according to FIG. 10 it is provided that both the pressure sensor 4 and flow sensor 5 are integrated into the sensor unit 8 which is configured to connect the catheter port 24 and the pump 7 to one another by flow technology (i.e. the fluid inflation medium is guided via the sensor unit 8).

The sensor unit 8 can be configured according to FIG. 10 to transmit the measured instantaneous pressure p and the measured instantaneous volume flow V', via a radio link or wirelessly, to the evaluation unit 6. For this purpose, the sensor unit 8 can have a coil 82 (in particular for near-field communication), wherein the coil 82 can also be used for charging an energy storage device 81. Furthermore, the sensor unit 8 can have an antenna 83 (e.g. 433 MHz) for transmitting and receiving radio signals to/from the evaluation unit.

Furthermore, the balloon catheter system 1 preferably has a data acquisition unit 7c which is configured for inputting one or more parameters characterizing the catheter 2, in particular to enable identification of the catheter 2 used, wherein the evaluation unit 6 is configured to use the respective parameter to identify a variable to be determined (see above) in order to make the signal evaluation and data processing more precise.

Figure 11:
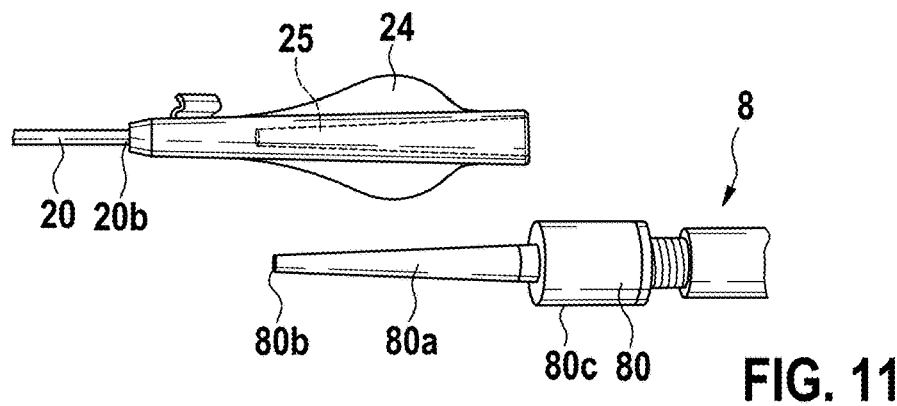
FIG. 11 shows the catheter port according to FIG. 10 and an outlet area of the sensor unit according to FIG. 10, which is configured for engaging in the catheter port in order to avoid a residual volume of the catheter port.
Figure 12:
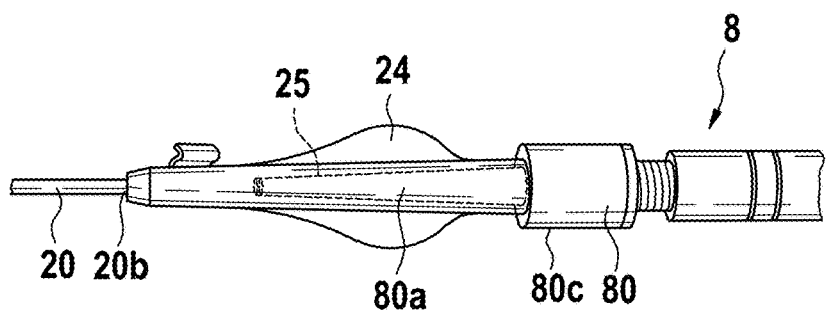
FIG. 12 shows the outlet area according to FIG. 11, wherein this is inserted properly into the catheter port.

The catheter port 24 usually has a certain inlet lumen 25 which is connected to the lumen 21 of the catheter shaft 20 or is in flow connection (cf. FIGS. 10 to 12). As air, that may collect in this area is a disturbance variable with regard to evaluating the measurement data, it is preferably provided that the sensor unit 8 has e.g. a conically tapering outlet area 80a for discharging the inflation medium 3 from the sensor unit 8, wherein the outlet area 80a is configured to engage positively in the inlet lumen 25.

The outlet area 80a can be formed for example by a conically tapering housing section 80a of a housing 800 of the sensor unit 8, wherein the housing section 80a has an outlet 80b at one end for discharging the inflation medium 3. The housing 800 is used for accommodating the pressure sensor 4 and the flow sensor 5 and in particular the further components of the sensor unit described above. If the catheter port 24 is configured as a luer connector, a corresponding connection area 80c is provided on the housing 800, which can engage with the Luer connector 24 in order to connect the catheter port 24 and the housing 800 or the sensor unit 8 to one another (according to a Luer principle).

The catheter port 24 (e.g. luer connector) and the outlet area 80a are thus configured such that as little air or residual volume as possible remains in the catheter port 24 or inlet lumen 25, so that it is not necessary to differentiate between air in the catheter port 24 and air in the balloon 22 during the evaluation. If air is excluded from the catheter port 24, the amount of air in the balloon can be estimated by modeling (since it has a purely linear compression behavior).

Alternatively to the catheter port/outlet area as presented above, the residual volume in the catheter port can be corrected mathematically if the volume of air in the catheter is known by corresponding precharacterization.

The sensor unit 8 is advantageously a compact link between the pump 7 and catheter port 24 and forms a flow path for the inflation medium 3, which preferably includes the entire sensor system, i.e. pressure sensor 4 and flow sensor 5. It is advantageous here for the flow sensor 5 to be in the form of a Coriolis flow sensor, as this can be easily sterilized and allows the flow of inflation medium 3 to be reversed.

Advantageously, with use of the invention the physician can obtain additional information during an angioplasty, which improves the performance of the angioplasty and the result of the procedure. In particular, the tissue contact has a limiting effect on the inflation of the balloon, whereby the volume and pressure at the time of contact with the tissue can be determined.

Advantageously, the following parameters can be further determined from the measurement data:

a current mean vessel diameter, an effective vessel counterpressure, a current volume deficit of the dilation, a dilation pressure, from which the tissue begins to yield, energy required for the dilation process.

Furthermore, the invention advantageously provides the following retrospective data on dilation:

forced mean diameter of the vessel elastic/plastic volume fraction of the dilation definition of a form factor deficit.

From this, the attending physician can further assess whether a post-dilation may be recommended.

It will be apparent to those skilled in the art that numerous modifications and variations of the described examples and embodiments are possible in light of the above teaching. The disclosed examples and embodiments are presented for purposes of illustration only. Other alternate embodiments may include some or all of the features disclosed herein. Therefore, it is the intent to cover all such modifications and alternate embodiments as may come within the true scope of this invention.

The invention claimed is:

1. A balloon catheter system, comprising:
   a catheter having a catheter shaft surrounding a lumen,
   a balloon connected to a distal end of the catheter shaft such that a fluid inflation medium can be introduced into and be removed from a balloon interior of the balloon via the lumen,
   a pressure sensor configured to measure inflation and/or deflation of the balloon,
   a flow sensor configured to measure a volume flow (v) of the inflation medium during the inflation and/or deflation, and
   an evaluation unit configured to record instantaneous pressure and the instantaneous volume flow during the inflation and/or deflation and to determine therefrom a time curve of the flow resistance (R).

2. The balloon catheter system according to claim 1, the evaluation unit determines the flow resistance (R) from at least one variable of the following variables:
   a time point at which the balloon contacts a vessel wall of the patient during inflation,
   energy necessary for dilating a stenosis of the patient, and
   a time point at which the stenosis is dilated.

3. The balloon catheter system according to claim 1, wherein the catheter comprises a catheter port connected to the lumen, wherein the pressure sensor is configured to measure the instantaneous pressure at the catheter port and/or wherein the flow sensor is configured to measure the volume flow at the catheter port.

4. The balloon catheter system according to claim 3, wherein the system comprises a pump configured to control the inflation medium for the inflation and deflation, and wherein the flow sensor is integrated into a sensor unit configured to connect the pump to the catheter port.

5. The balloon catheter system according to claim 3, wherein the system comprises a pump configured to control the inflation medium for the inflation, and wherein the pressure sensor and the flow sensor are integrated into a sensor unit configured to connect the catheter port and the pump to one another.

6. The balloon catheter system according to claim 5, wherein the sensor unit is configured to transmit the measured instantaneous pressure and the measured instantaneous volume flow to the evaluation unit via a radio link.

7. The balloon catheter system according to claim 3, wherein the catheter port comprises an inlet lumen connected to the lumen of the catheter shaft, and wherein the balloon catheter system comprises a sensor unit comprising an outlet area for discharging the inflation medium from the sensor unit, wherein the outlet area is configured to positively engage in the inlet lumen.

8. The balloon catheter system according to claim 1, wherein the flow sensor comprises a Coriolis flow sensor.

9. The balloon catheter system of claim 1, wherein the system comprises a pump configured to control the inflation medium for the inflation and deflation.

10. The balloon catheter system according to claim 9, wherein the pressure sensor is integrated into the pump.

11. The balloon catheter system according to claim 1, comprising a data acquisition unit configured to input one or more parameters characterizing the catheter.

12. The balloon catheter system according to claim 11, wherein the evaluation unit is configured to use the one or more parameters in determining at least one variable from the flow resistance (R).

13. A method for inflating a balloon of a catheter with a fluid inflation medium, comprising the steps:
measuring and recording an instantaneous volume flow (v) of the inflation medium and an instantaneous pressure (p) of the inflation medium during inflation and/or deflation of the balloon, and
automatically determining a time curve of the flow resistance (R) during the inflation and/or deflation of the balloon from measured variables of the instantaneous pressure and the instantaneous volume flow.

14. The method according to claim 13, comprising automatically determining at least one variable of the following variables from the flow resistance (R):
a time point, at which the balloon contacts a vessel wall of the patient on inflation,
energy necessary for dilating a stenosis of the patient,
a time point at which the stenosis is dilated.

* * * * *